US008394452B2

(12) United States Patent
Dong et al.

(10) Patent No.: US 8,394,452 B2
(45) Date of Patent: Mar. 12, 2013

(54) CARBON FRICTION MATERIALS (75) Inventors: Feng Dong, Rochester, MI (US); Robert C. Lam, Rochester, MI (US); Yih-Fang Chen, Lisle, IL (US)

(73) Assignee: BorgWarner Inc., Auburn Hills, MI (US)

( * ) Notice: Subject to any disclaimer, the term of this patent is extended or adjusted under 35 U.S.C. 154(b) by 680 days.

(21) Appl. No.: 12/084,514

(22) PCT Filed: Oct. 31, 2006

(86) PCT No.: PCT/US2006/042342
§ 371 (c)(1),
(2), (4) Date: Aug. 11, 2010

(87) PCT Pub. No.: WO2007/055951
PCT Pub. Date: May 18, 2007

(65) Prior Publication Data
US 2010/0304631 A1      Dec. 2, 2010

Related U.S. Application Data (60) Provisional application No. 60/732,765, filed on Nov. 2, 2005.

(51) Int. Cl.
*B05D 3/02* (2006.01)
(52) U.S. Cl. ........ 427/226; 427/227; 427/228; 427/384; 427/385.5; 427/389.9
(58) Field of Classification Search .................. None
See application file for complete search history.

(56) References Cited

U.S. PATENT DOCUMENTS

| | | | |
|---|---|---|---|
| 1,039,168 A | 9/1912 | Melton |
| 1,682,198 A | 8/1928 | Sitton |
| 1,860,147 A | 5/1932 | Hadley |
| 2,100,347 A | 11/1937 | Nanfeldt |
| 2,182,208 A | 12/1939 | Nason |
| 2,221,893 A | 11/1940 | White |
| 2,307,814 A | 1/1943 | Walters |
| 2,316,874 A | 4/1943 | Kraft |
| 2,354,526 A | 7/1944 | Lapsley et al. |
| 2,516,544 A | 7/1950 | Breeze |
| 2,555,261 A | 5/1951 | Walters |
| 2,702,770 A | 2/1955 | Steck |
| 2,749,264 A | 6/1956 | Emrick |
| 2,779,668 A | 1/1957 | Daniels |
| 3,020,139 A | 2/1962 | Camp et al. |
| 3,080,028 A | 3/1963 | Kennedy |
| 3,215,648 A | 11/1965 | Duffy |
| 3,270,846 A | 9/1966 | Arledter et al. |
| 3,429,766 A | 2/1969 | Stormfeltz |
| 3,520,390 A | 7/1970 | Bentz |
| 3,526,306 A | 9/1970 | Bentz |
| 3,578,122 A | 5/1971 | Magnier |
| 3,654,777 A | 4/1972 | Grundman |
| 3,746,669 A | 7/1973 | Dunnom |
| 3,871,934 A | 3/1975 | Marin |
| 3,885,006 A | 5/1975 | Hatch et al. |

(Continued)

FOREIGN PATENT DOCUMENTS

EP    1679337    7/2006
JP    11005850   1/1999

*Primary Examiner* — Erma Cameron
(74) *Attorney, Agent, or Firm* — BrooksGroup (57) ABSTRACT

Sintered, carbon friction materials are made from fibrous materials that are impregnated with resins prior to sintering. Preferably, non-woven fibrous materials are impregnated with phenolic resin and sintered at 400 to 8000 C. The resulting material has an open porosity above 50 percent by volume.

8 Claims, 4 Drawing Sheets

Sintering process enhanced the compressibility

U.S. PATENT DOCUMENTS

| | | | |
|---|---|---|---|
| 3,899,050 A | 8/1975 | Savary et al. |
| 3,911,045 A | 10/1975 | Hartmann et al. |
| 3,927,241 A | 12/1975 | Augustin |
| 3,944,686 A | 3/1976 | Froberg |
| 3,950,047 A | 4/1976 | Capelli |
| 3,980,729 A | 9/1976 | Yokokawa et al. |
| 4,002,225 A | 1/1977 | Marin |
| 4,020,226 A | 4/1977 | Andrianov et al. |
| 4,033,437 A | 7/1977 | Labat |
| 4,045,608 A | 8/1977 | Todd |
| 4,051,097 A | 9/1977 | Aldrich |
| 4,084,863 A | 4/1978 | Capelli |
| 4,098,630 A | 7/1978 | Morse |
| 4,113,894 A | 9/1978 | Koch, II |
| 4,150,188 A | 4/1979 | Brulet |
| 4,197,223 A | 4/1980 | Bartram |
| 4,209,086 A | 6/1980 | Friedrich |
| 4,226,906 A | 10/1980 | Jacob |
| 4,239,666 A | 12/1980 | Jacko et al. |
| 4,256,801 A | 3/1981 | Chuluda |
| 4,259,397 A | 3/1981 | Saito et al. |
| 4,260,047 A | 4/1981 | Nels |
| 4,267,912 A | 5/1981 | Bauer et al. |
| 4,291,794 A | 9/1981 | Bauer |
| 4,320,823 A | 3/1982 | Covaleski |
| 4,324,706 A | 4/1982 | Tabe et al. |
| 4,352,750 A | 10/1982 | Eschen |
| 4,373,038 A | 2/1983 | Moraw et al. |
| 4,374,211 A | 2/1983 | Gallagher et al. |
| 4,396,100 A | 8/1983 | Eltze |
| 4,444,574 A | 4/1984 | Tradwell et al. |
| 4,451,590 A | 5/1984 | Fujimaki et al. |
| 4,453,106 A | 6/1984 | La Fiandra |
| 4,456,650 A | 6/1984 | Melotik et al. |
| 4,457,967 A | 7/1984 | Chareire et al. |
| 4,490,432 A | 12/1984 | Jordan |
| 4,514,541 A | 4/1985 | Frances |
| 4,522,290 A | 6/1985 | Klink |
| 4,524,169 A | 6/1985 | Wolff et al. |
| 4,543,106 A | 9/1985 | Parekh |
| 4,563,386 A | 1/1986 | Schwartz |
| 4,593,802 A | 6/1986 | Danko, Jr. |
| 4,628,001 A | 12/1986 | Sasaki et al. |
| 4,639,392 A | 1/1987 | Nels et al. |
| 4,646,900 A | 3/1987 | Crawford et al. |
| 4,656,203 A | 4/1987 | Parker |
| 4,657,951 A | 4/1987 | Takarada et al. |
| 4,663,230 A | 5/1987 | Tennent |
| 4,663,368 A | 5/1987 | Harding et al. |
| 4,672,082 A | 6/1987 | Nakagawa et al. |
| 4,674,616 A | 6/1987 | Mannino, Jr. |
| 4,694,937 A | 9/1987 | Jonas |
| 4,698,889 A | 10/1987 | Patzer et al. |
| 4,700,823 A | 10/1987 | Winckler |
| 4,726,455 A | 2/1988 | East |
| 4,732,247 A | 3/1988 | Frost |
| 4,742,723 A | 5/1988 | Lanzerath et al. |
| 4,743,634 A | 5/1988 | Royer |
| 4,770,283 A | 9/1988 | Putz et al. |
| 4,772,508 A | 9/1988 | Brassell |
| 4,792,361 A | 12/1988 | Double et al. |
| 4,861,809 A | 8/1989 | Ogawa et al. |
| 4,878,282 A | 11/1989 | Bauer |
| 4,913,267 A | 4/1990 | Campbell et al. |
| 4,915,856 A | 4/1990 | Jamison |
| 4,917,743 A | 4/1990 | Gramberger et al. |
| 4,918,116 A | 4/1990 | Gardziella et al. |
| 4,927,431 A | 5/1990 | Buchanan et al. |
| 4,950,530 A | 8/1990 | Shibatani |
| 4,951,798 A | 8/1990 | Knoess |
| 4,983,457 A | 1/1991 | Hino et al. |
| 4,986,397 A | 1/1991 | Vierk |
| 4,995,500 A | 2/1991 | Payvar |
| 4,997,067 A | 3/1991 | Watts |
| 5,004,497 A | 4/1991 | Shibata et al. |
| 5,017,268 A | 5/1991 | Clitherow et al. |
| 5,033,596 A | 7/1991 | Genise |
| 5,038,628 A | 8/1991 | Kayama |
| 5,076,882 A | 12/1991 | Oyanagi et al. |
| 5,077,130 A * | 12/1991 | Okuyama et al. ............ 428/408 |
| 5,080,969 A | 1/1992 | Tokumura |
| 5,083,650 A | 1/1992 | Seiz et al. |
| 5,093,388 A | 3/1992 | Siemon, Jr. et al. |
| 5,094,331 A | 3/1992 | Fujimoto et al. |
| 5,101,953 A | 4/1992 | Payvar |
| 5,105,522 A | 4/1992 | Gramberger et al. |
| 5,143,192 A | 9/1992 | Vojacek et al. |
| 5,164,256 A | 11/1992 | Sato et al. |
| 5,211,068 A | 5/1993 | Spitale et al. |
| 5,221,401 A | 6/1993 | Genise |
| 5,233,736 A | 8/1993 | Hill |
| 5,259,947 A | 11/1993 | Kalback et al. |
| 5,266,395 A | 11/1993 | Yamashita et al. |
| 5,269,400 A | 12/1993 | Fogelberg |
| 5,290,627 A | 3/1994 | Ikuta |
| 5,313,793 A | 5/1994 | Kirkwood et al. |
| 5,332,075 A | 7/1994 | Quigley et al. |
| 5,335,765 A | 8/1994 | Takakura et al. |
| 5,354,603 A | 10/1994 | Errede et al. |
| 5,376,425 A | 12/1994 | Asano et al. |
| 5,395,864 A | 3/1995 | Miyoshi et al. |
| 5,396,552 A | 3/1995 | Jahn et al. |
| 5,437,780 A | 8/1995 | Southard et al. |
| 5,439,087 A | 8/1995 | Umezawa |
| 5,445,060 A | 8/1995 | Randall et al. |
| 5,453,317 A | 9/1995 | Yesnik |
| 5,460,255 A | 10/1995 | Quigley et al. |
| 5,472,995 A | 12/1995 | Kaminski et al. |
| 5,474,159 A | 12/1995 | Soennecken et al. |
| 5,478,642 A | 12/1995 | McCord |
| 5,501,788 A | 3/1996 | Romine et al. |
| 5,520,866 A | 5/1996 | Kaminski et al. |
| 5,529,666 A | 6/1996 | Yesnik |
| 5,540,621 A | 7/1996 | Keester et al. |
| 5,540,832 A | 7/1996 | Romino |
| 5,540,903 A | 7/1996 | Romine |
| 5,571,372 A | 11/1996 | Miyaishi et al. |
| 5,585,166 A | 12/1996 | Kearsey |
| 5,615,758 A | 4/1997 | Nels |
| 5,620,075 A | 4/1997 | Larsen et al. |
| 5,639,804 A | 6/1997 | Yesnik |
| 5,643,663 A | 7/1997 | Bommier et al. |
| 5,646,076 A | 7/1997 | Bortz |
| 5,648,041 A | 7/1997 | Rodgers et al. |
| 5,662,993 A | 9/1997 | Winckler |
| 5,670,231 A | 9/1997 | Ohya et al. |
| 5,671,835 A | 9/1997 | Tanaka et al. |
| 5,674,947 A | 10/1997 | Oishi et al. |
| 5,676,577 A | 10/1997 | Lam et al. |
| 5,705,120 A | 1/1998 | Ueno et al. |
| 5,707,905 A | 1/1998 | Lam et al. |
| 5,718,855 A | 2/1998 | Akahori et al. |
| 5,733,176 A | 3/1998 | Robinson et al. |
| 5,753,018 A | 5/1998 | Lamport et al. |
| 5,753,356 A | 5/1998 | Lam et al. |
| 5,766,523 A | 6/1998 | Rodgers et al. |
| 5,771,691 A | 6/1998 | Kirkwood et al. |
| 5,775,468 A | 7/1998 | Lam et al. |
| 5,776,288 A | 7/1998 | Stefanutti et al. |
| 5,777,791 A | 7/1998 | Hedblom |
| 5,792,544 A | 8/1998 | Klein |
| 5,803,210 A | 9/1998 | Kohno et al. |
| 5,816,901 A | 10/1998 | Sirany |
| 5,827,610 A | 10/1998 | Ramachandran |
| 5,834,551 A | 11/1998 | Haraguchi et al. |
| 5,842,551 A | 12/1998 | Nels |
| 5,845,754 A | 12/1998 | Weilant |
| 5,851,588 A | 12/1998 | Uthoff, Jr. |
| 5,856,244 A | 1/1999 | Lam et al. |
| 5,858,166 A | 1/1999 | James et al. |
| 5,858,883 A | 1/1999 | Lam et al. |
| 5,889,082 A | 3/1999 | Kaminski et al. |
| 5,895,716 A | 4/1999 | Fiala et al. |
| 5,897,737 A | 4/1999 | Quigley |
| 5,919,528 A | 7/1999 | Huijs et al. |
| 5,919,837 A | 7/1999 | Kaminski et al. |
| 5,952,249 A | 9/1999 | Gibson et al. |

| | | | | | | |
|---|---|---|---|---|---|---|
| 5,958,507 | A | 9/1999 | Lam et al. | 6,875,711 B2 | 4/2005 | Chen et al. |
| 5,965,658 | A | 10/1999 | Smith et al. | 6,951,504 B2 | 10/2005 | Adefris et al. |
| 5,975,270 | A | 11/1999 | Tokune et al. | 7,014,027 B2 | 3/2006 | Adair et al. |
| 5,975,988 | A | 11/1999 | Christianson | 7,160,913 B2 | 1/2007 | Schneider |
| 5,989,375 | A | 11/1999 | Bortz | 7,208,432 B1 | 4/2007 | Beier et al. |
| 5,989,390 | A | 11/1999 | Lee | 7,294,388 B2 | 11/2007 | Lam et al. |
| 5,998,307 | A | 12/1999 | Lam et al. | 7,332,240 B2 | 2/2008 | O'Hara et al. |
| 5,998,311 | A | 12/1999 | Nels | 7,429,418 B2 | 9/2008 | Lam et al. |
| 6,000,510 | A | 12/1999 | Kirkwood et al. | 2002/0068164 A1 | 6/2002 | Martin |
| 6,001,750 | A | 12/1999 | Lam | 2002/0164473 A1 | 11/2002 | Buckley |
| 6,019,205 | A | 2/2000 | Willworth | 2003/0050831 A1 | 3/2003 | Klayh |
| 6,042,935 | A | 3/2000 | Krenkel et al. | 2003/0053735 A1 | 3/2003 | Vernooy |
| 6,060,536 | A | 5/2000 | Matsumoto et al. | 2003/0134098 A1 | 7/2003 | Bauer et al. |
| 6,065,579 | A | 5/2000 | Nels | 2003/0154882 A1 | 8/2003 | Nagata et al. |
| 6,074,950 | A | 6/2000 | Wei | 2004/0006192 A1 | 1/2004 | Aiba et al. |
| 6,121,168 | A | 9/2000 | Irifune et al. | 2004/0033341 A1 | 2/2004 | Lam et al. |
| 6,123,829 | A | 9/2000 | Zommerman et al. | 2004/0043193 A1 | 3/2004 | Chen et al. |
| 6,130,176 | A | 10/2000 | Lam | 2004/0043243 A1 | 3/2004 | Chen et al. |
| 6,132,877 | A | 10/2000 | Winckler et al. | 2004/0081795 A1 | 4/2004 | Wang et al. |
| 6,140,388 | A | 10/2000 | Nass et al. | 2004/0081813 A1 | 4/2004 | Dong |
| 6,163,636 | A | 12/2000 | Stentz et al. | 2004/0192534 A1 | 9/2004 | Nixon et al. |
| 6,182,804 | B1 | 2/2001 | Lam | 2004/0198866 A1 | 10/2004 | Sasaki |
| 6,194,059 | B1 | 2/2001 | Yesnik | 2004/0224864 A1 | 11/2004 | Patterson et al. |
| 6,217,413 | B1 | 4/2001 | Christianson | 2005/0004258 A1 | 1/2005 | Yamamoto et al. |
| 6,231,977 | B1 | 5/2001 | Suzuki et al. | 2005/0025967 A1 | 2/2005 | Lawton et al. |
| 6,265,066 | B1 | 7/2001 | Suzuki et al. | 2005/0039872 A1 | 2/2005 | Kimura et al. |
| 6,284,815 | B1 | 9/2001 | Sasahara et al. | 2005/0064778 A1 | 3/2005 | Lam et al. |
| 6,291,040 | B1 | 9/2001 | Moriwaki et al. | 2005/0074595 A1 | 4/2005 | Lam |
| 6,315,974 | B1 | 11/2001 | Murdie et al. | 2005/0075019 A1 | 4/2005 | Lam et al. |
| 6,316,086 | B1 | 11/2001 | Beier et al. | 2005/0075021 A1 | 4/2005 | Lam et al. |
| 6,323,160 | B1 | 11/2001 | Murdie et al. | 2005/0075022 A1 | 4/2005 | Lam |
| 6,352,758 | B1 | 3/2002 | Huang et al. | 2005/0075413 A1 | 4/2005 | Lam |
| 6,383,605 | B1 | 5/2002 | Ejiri | 2005/0075414 A1 | 4/2005 | Lam et al. |
| 6,387,531 | B1 | 5/2002 | Bi et al. | 2005/0191477 A1 | 9/2005 | Dong |
| 6,423,668 | B1 | 7/2002 | Nakanishi et al. | 2005/0271876 A1 | 12/2005 | Walker et al. |
| 6,432,151 | B1 | 8/2002 | So et al. | 2005/0281971 A1 | 12/2005 | Lam et al. |
| 6,432,187 | B1 | 8/2002 | Ogawa et al. | 2006/0008635 A1 | 1/2006 | Dong et al. |
| 6,524,681 | B1 | 2/2003 | Seitz et al. | 2006/0019085 A1 | 1/2006 | Lam et al. |
| 6,569,816 | B2 | 5/2003 | Oohira et al. | 2006/0062987 A1 | 3/2006 | Niewohner et al. |
| 6,586,373 | B2 | 7/2003 | Suzuki et al. | 2006/0121263 A1 | 6/2006 | Komori et al. |
| 6,601,321 | B1 | 8/2003 | Kendall | 2006/0151912 A1 | 7/2006 | Bauer |
| 6,630,416 | B1 | 10/2003 | Lam et al. | 2006/0241207 A1 | 10/2006 | Lam et al. |
| 6,638,883 | B2 | 10/2003 | Gaffney et al. | 2007/0011951 A1 | 1/2007 | Gaeta et al. |
| 6,652,363 | B2 | 11/2003 | Kramer et al. | 2007/0062777 A1 | 3/2007 | Zagrodzki et al. |
| 6,668,891 | B2 | 12/2003 | Collis | 2007/0117881 A1 | 5/2007 | Watanabe et al. |
| 6,703,117 | B2 | 3/2004 | Gruber et al. | 2007/0205076 A1 | 9/2007 | Takahashi et al. |
| 6,808,225 | B2 | 10/2004 | Moriyama | | | |
| 6,831,146 | B2 | 12/2004 | Aiba et al. | * cited by examiner | | |
| 6,855,410 | B2 | 2/2005 | Buckley | | | |

The carbonized materials have higher energy capacity than the original materials.

CARBON FRICTION MATERIALS

CROSS REFERENCE

This application claims the benefit of provisional U.S. patent application Ser. No. 60/732,765 filed 2 Nov. 2005.

TECHNICAL FIELD

The present invention relates to carbon friction material made by sintering. More specifically, the sintered, carbon friction material are made by sintering resin impregnated fibrous materials.

BACKGROUND OF THE INVENTION

New and advanced continuous torque transmission systems, having continuous slip torque converters and shifting clutch systems are being developed by the automotive industry. These new systems often involve high energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also the friction material must be able to withstand high facing lining pressures up to about 1500 psi. it is also important that the friction material be useful under limited lubrication conditions.

The friction material must be durable and have high heat resistance in order to be useful in the advanced systems. Not only must the friction material remain stable at high temperatures, it must also be able to rapidly dissipate the high heat that is being generated during operating conditions.

The high speeds generated during engagement and disengagement of the new systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired toque curve shape so that during frictional engagement the friction materials is noise or "squawk" free.

While phenolic resins are conventionally used as an impregnant in wet friction materials for wet clutch applications, the phenolic resins have various limitations. The phenolic resin friction materials do not have the high heat resistance necessary for use with the new high energy transmission systems. In particular, the phenolic resins decompose at a temperature of about 300° C. which is too low to be useful in high energy applications. In addition, phenolic resins are rigid materials and when the phenolic resins are used in a friction material, uneven lining wear, and separator plate "hot spots" are more likely result if uniform contact is not obtained.

As a result of extensive research in view of the need for a better friction material, a friction material with improved characteristics has been developed by the invention. The present wet friction material is useful in "wet" applications where the friction material is "wetted" or impregnated with a liquid such as brake fluid or automatic transmission fluid during use. During use of the "wet" friction material, the fluid is ultimately squeezed from or is impregnating the friction material. Wet friction materials differ greatly, both in their compositions and physical characteristics from "dry" friction materials.

A need exists to continue the search for increased porosity of "wet" friction material. The open pores of existing "wet" friction material made by the paper making process is about 50 percent by volume. The porosity of other "wet" friction materials such as those made with compression molding is below 50 percent by volume.

SUMMARY OF THE INVENTION

Unique carbon friction materials are made from sintering of fibrous materials at a temperature range of 400 C to 800 C. These fibrous materials can comprise of various fibers with or without fillers and particles. The materials are impregnated with resins first before sintering. The resulting material is a sintered, porous carbon body. Preferably the fibrous materials are paper and non-woven fibrous materials and preferably the resin is a phenolic resin.

The sintered, carbon friction materials of this invention have an open porosity substantially above 50 percent by volume. When fiber/filler type friction materials were treated below 550 C, the material retain enough flexibility and strength. The pore size increases as the treatment temperature increases; surfaces also becomes more open. Friction coefficient increases as the treatment temperature increases; friction-speed curves becomes more positive/desirable.

Other objects and advantages of the present invention will become apparent to those skilled in the art upon a review of the following detailed description of the preferred embodiments and the accompanying drawings.

DETAILED DESCRIPTION OF THE INVENTION

Various resins useful with the present invention include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Generally, the sintered, porous body has a substantial specific surface area. Further, the sintered, porous body has pore voids and has a substantial volume of pore voids. This provides a unique sintered, porous body having an open pore structure.

According to the present invention, a friction material has a uniform dispersion of the resin throughout a base material. In certain embodiments, the resin material comprises about 45 to about 65 parts, by weight, per 100 parts, by weight, of the friction material.

In certain embodiments, after the resin material has been applied to the base material and the base material has been impregnated with the resin mixture, the impregnated base material is heated to a desired temperature for a predetermined length of time to form a friction material. Thereafter, the cured friction material is adhered to a desired substrate by suitable means.

Figure 1:
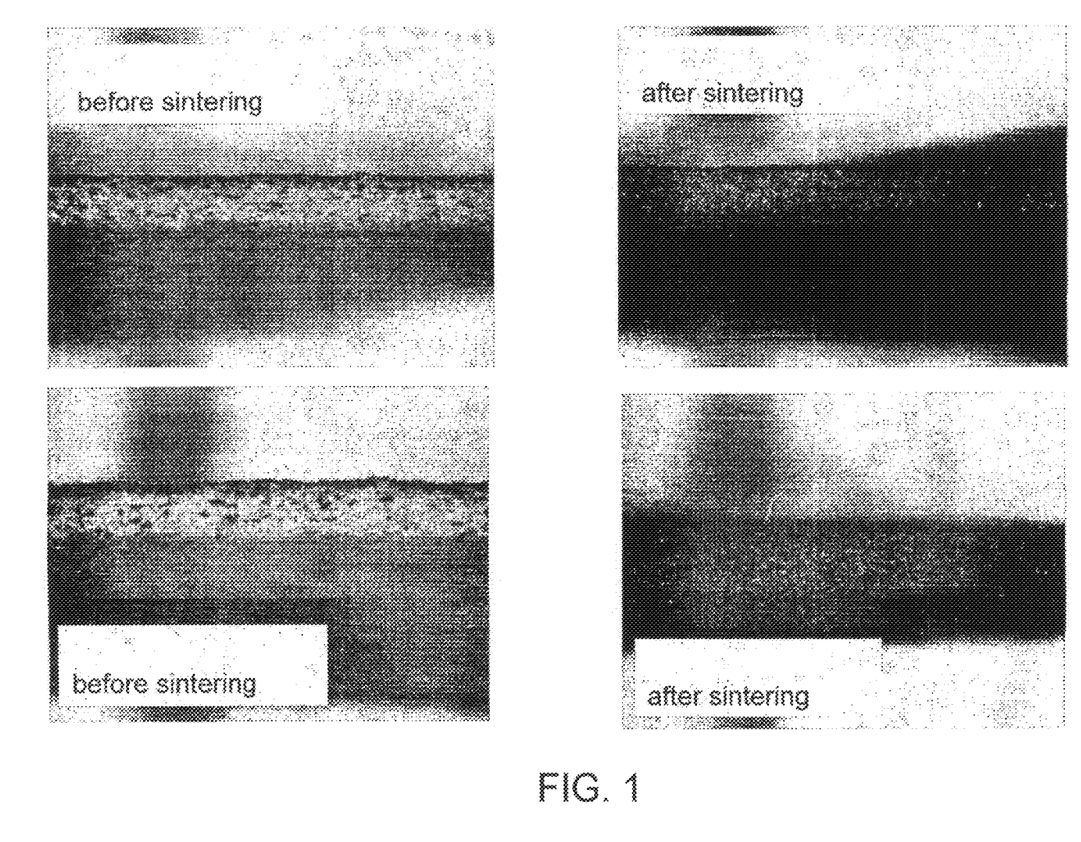
FIG. 1 is a side view of carbonized samples according to this invention.

FIG. 1 is a side view of carbonized samples according to this invention. The views show samples before and after carbonization.

Figure 2:
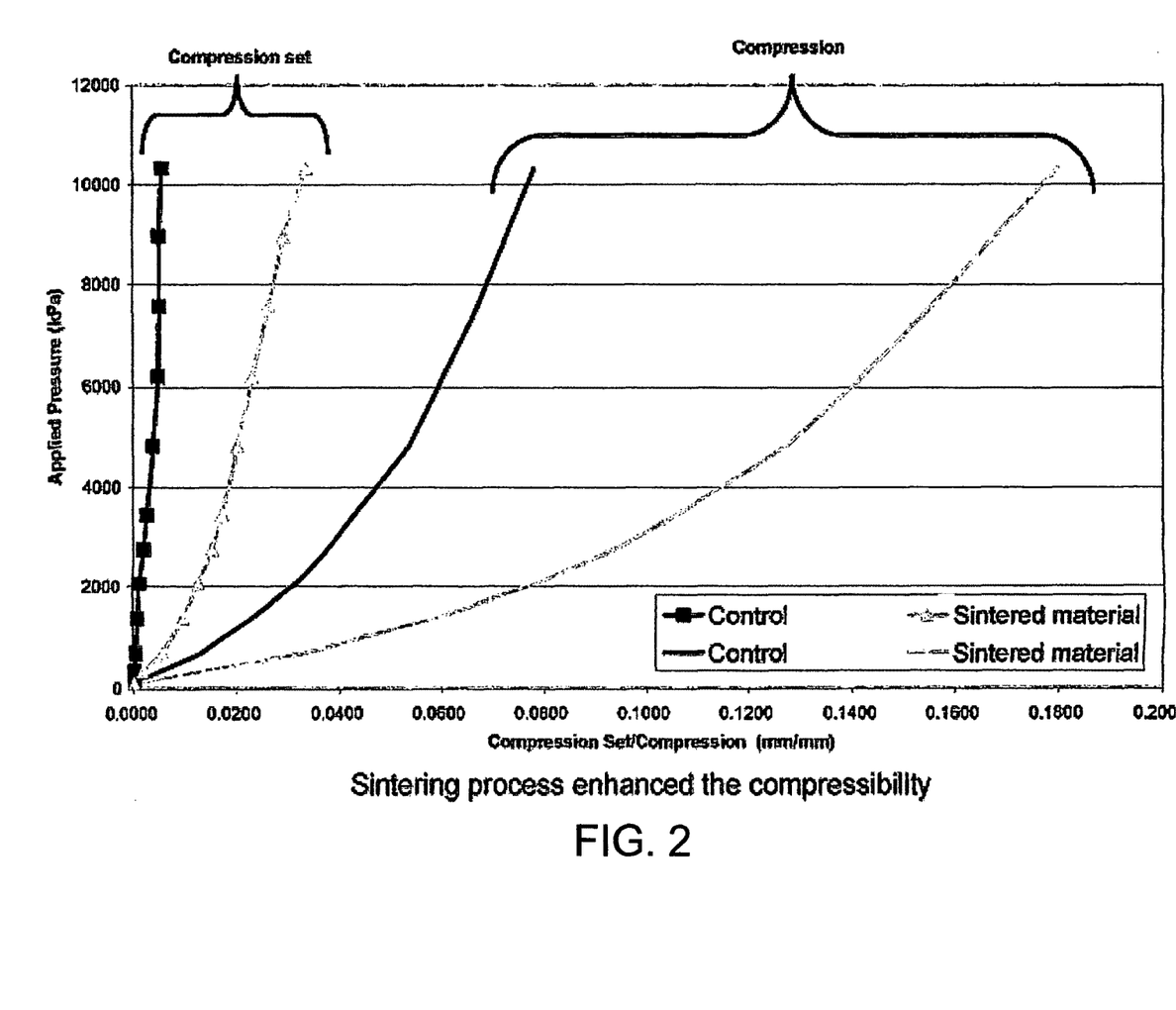
FIG. 2 is a is a graph showing that the carbonization of this invention enhanced compressibility.

FIG. 2 is a graph showing that the carbonization of this invention enhanced compressibility. The carbonized fibrous base materials had an increased compressibility, which improve hot spot resistance and friction character tics.

Figure 3:
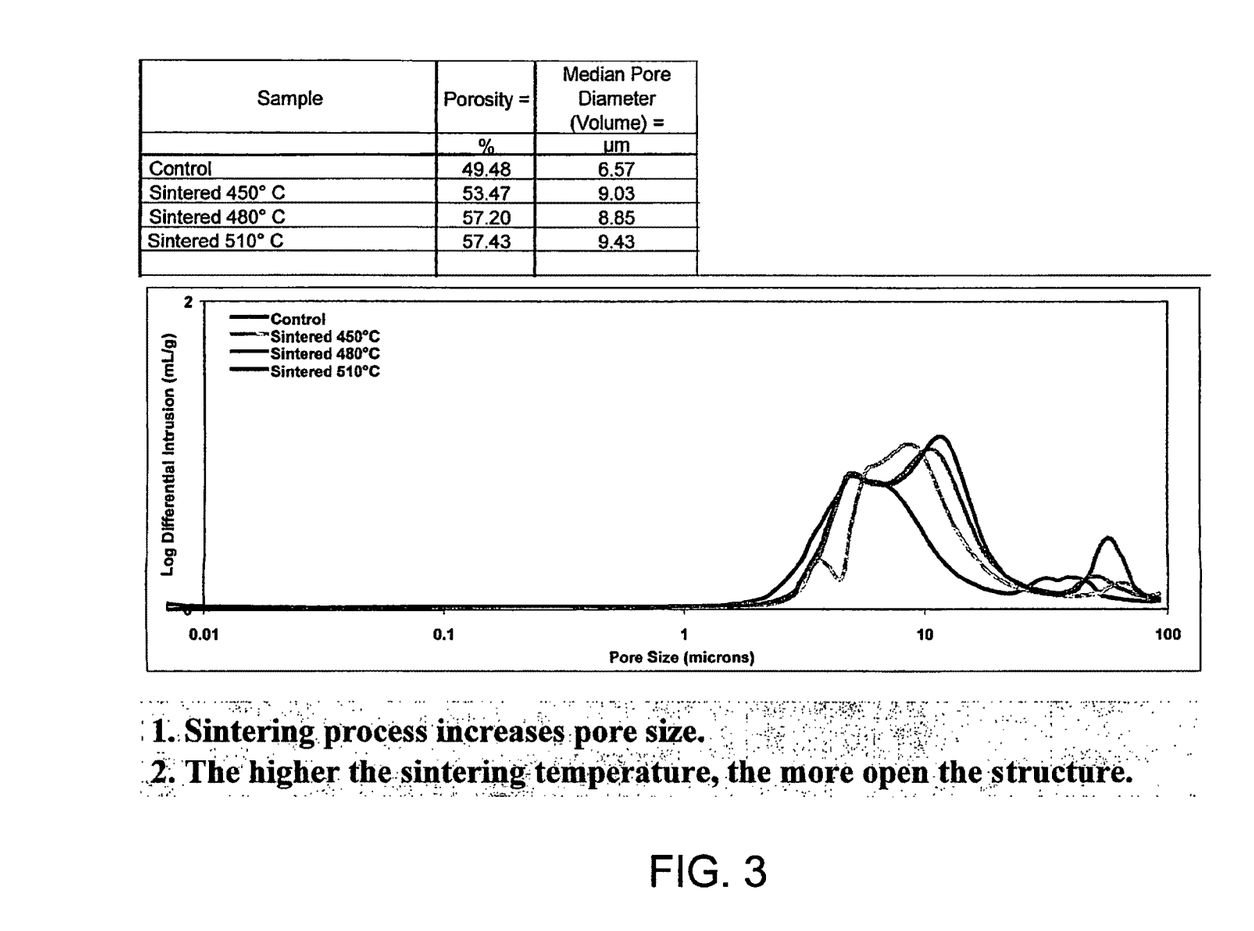
FIG. 3 is a graph showing the enhanced carbonization effect on pore size.

FIG. 3 is a graph showing the enhanced carbonization effect on pore size. The graph shows that carbonization increases pore size. The graph also shows that the higher the carbonization temperature, the more open the structure.

Figure 4:
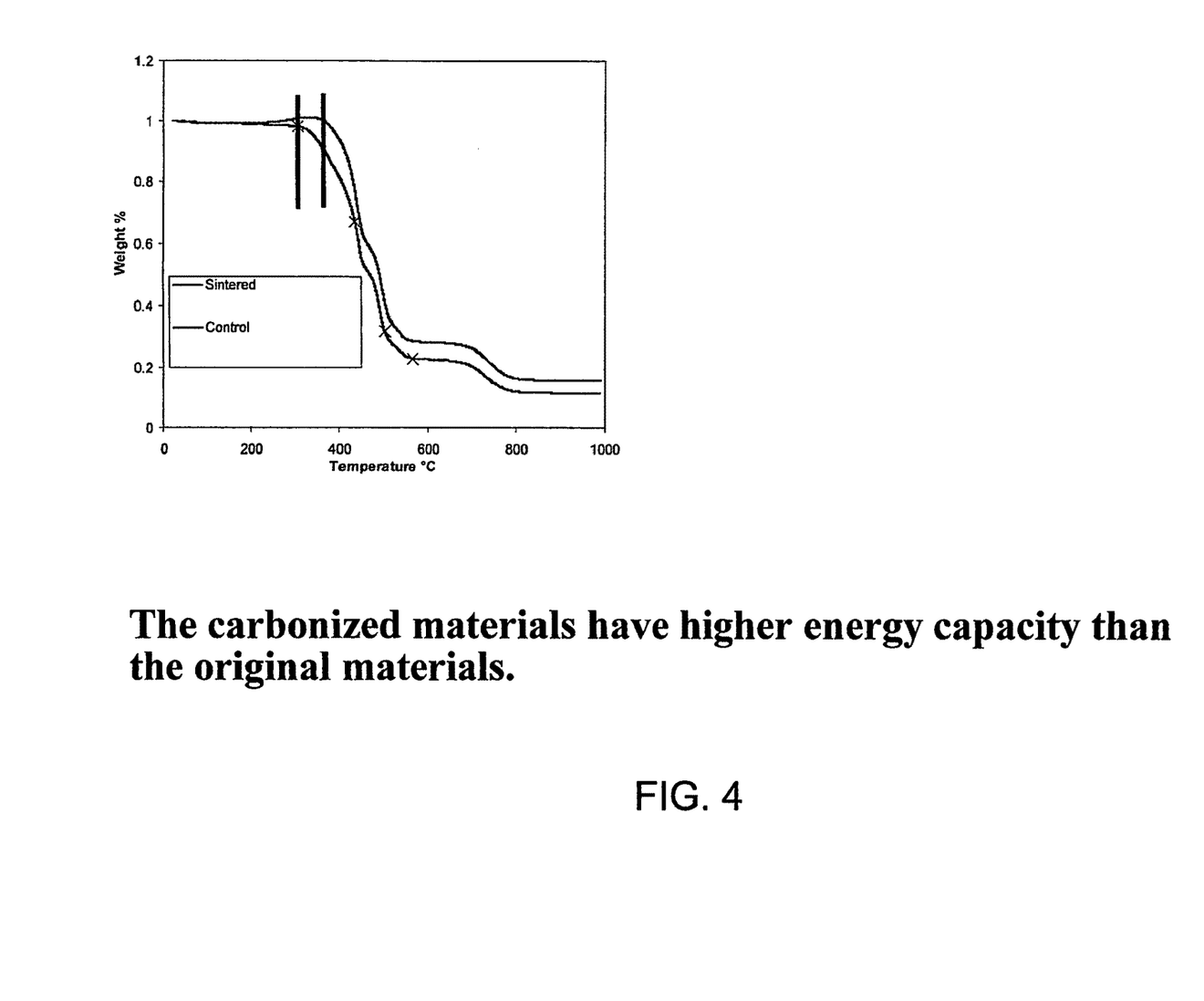
FIG. 4 is a graph showing the improved carbonization effect on thermal resistance.

FIG. 4 is a graph showing the improved carbonization effect on thermal resistance. The carbonized materials have higher energy capacity than the original uncarbonized materials.

In certain embodiments, it is preferred that the target pick up of resin by the base material ranges from about 25 to about 120%, in other embodiments, from about 40 to about 100%, and, in certain embodiments, about 60 to at least 80%, by weight, total phenolic resin material. After the base material is saturated with the resin, the base material is cured for a period of time (in certain embodiments for about ½ hour) at temperatures ranging between 160-250° C. to cure the resin material and form the friction material. The final thickness of the friction material depends on the initial thickness of the base material.

It further contemplated that other ingredients and processing aids known to be useful in both preparing resin blends and in preparing fibrous base materials can be included, and are within the contemplated scope of the present invention.

Sintering typically is performed under an inert or reducing atmosphere such as a mixture of nitrogen and hydrogen or a gas mixture containing carbon monoxide (CO) as well. The sintered parts are then subjected to a heating phase, during which transformation of the microstructure may occur. Sintering may be carried out under a reducing gas which does not itself contain a carbon compound, such as a mixture of nitrogen with 10% by volume of hydrogen.

The process of the invention may be used in the production of self-supporting sintered bodies, e.g. sintered bodies having a self-supporting skeleton.

Base Materials

Various base materials are useful in the friction material of the present invention, including, for example, non-asbestos fibrous base materials comprising, for example, fabric materials, woven and/or nonwoven materials. Suitable fibrous base materials include, for example, fibers and fillers. The fibers can be organic fibers, inorganic fibers and carbon fibers. The organic fibers can be aramid fibers, polyester fibers, nylon fibers, polyamide fibers, cotton/cellulose fibers and the like. The fillers can be, for example, silica, diatomaceous earth, graphite, alumina, cashew dust and the like.

In other embodiments, the base material can comprise fibrous woven materials, fibrous non-woven materials and paper materials. Further, examples of the various types of fibrous base materials useful in the present invention are disclosed in many BorgWarner U.S. patents. It should be understood however, that other embodiments of the present invention can include yet different fibrous base materials.

For example, in certain embodiments, the fibrous base material comprises a fibrous base material where less fibrillated fibers and carbon fibers are used in the fibrous base material to provide a desirable pore structure to the friction material. The fiber geometry not only provides increased thermal resistance, but also provides delamination resistance and squeal or noise resistance. Also, in certain embodiments, the presence of the carbon fibers and carbon particles aids in the fibrous base material in increasing the thermal resistance, maintaining a steady coefficient of friction and increasing the squeal resistance. A relatively low amount of cotton fibers in the fibrous base material can be included to improve the friction material's clutch "break-in" characteristics.

Various fillers are also useful in the primary layer of the fibrous base material of the present invention. In particular, silica fillers, such as diatomoaceous earth, are useful. However, it is contemplated that other types of fillers are suitable for use in the present invention and that the choice of filler depends on the particular requirements of the friction material.

In the preferred embodiment, the sintered friction material is made from aramid fibers. Also, however, the sintered fibers may be acrylic fibers alone or in combination with aramid fibers.

In certain embodiments, cotton fiber is added to the fibrous base material of the present invention to give the fibrous material higher coefficients of friction. In certain embodiments, about 5 to about 20%, and, in certain embodiments, about 10% cotton can also be added to the fibrous base material.

One example of a formulation for the primary layer of a fibrous base material comprises about 75% to about 85%, by weight, of a less fibrillated aramid fiber; and, about 15% to about 25%, by weight of a filler material.

In certain other embodiments, one particular formulation has found to be useful comprises about 35 to about 45%, by weight, less fibrillated aramid fibers; about 5 to about 15% cotton fibers; about 2 to about 20%, by weight, carbon fibers; and, about 25 to about 35%, by weight, filler.

In still other embodiments, the base material comprises from about 15 to about 25% cotton, about 40 to about 50% aramid fibers, about 10 to about 20% carbon fibers; and, friction modifying particles comprising about 5 to about 15% celite, and, optionally about 1 to about 3% latex add-on.

When the fibrous base material has a higher mean pore diameter and fluid permeability, the friction material is more likely to run cooler or with less heat generated in a transmission due to better automatic transmission fluid flow throughout the porous structure of the friction material. During operation of a transmission system, the fluid tends, over time, to breakdown and form "oil deposits", especially at higher temperatures. These "oil deposits" decrease the pore openings. Therefore, when the friction material initially starts with lager pores, there are more open pores remaining during the useful life of the friction material.

The friction modifying particles on the top surface of the fibrous base material provides an improved three-dimensional structure to the resulting friction material.

The layer of oil or fluid on the top friction modifying particle layer keeps the oil film on the surface, thus making it more difficult for the oil or fluid to initially penetrate into the friction material. The top friction modifying material layer holds the fluid lubricant on the surface and increases the oil retaining capacity of the friction material. The friction material of the present invention thus allows an oil film to remain on its surface. This also provides good coefficient of friction characteristics and good slip durability characteristics.

In certain embodiments, the average area of coverage of friction modifying particles forming the top layer is in the range of about 80 to about 100% of the surface area. In certain other embodiments, the average area of coverage ranges from about 90 to about 100%. The friction modifying particle substantially remain on the top surface of the base material at a preferred average thickness of about 35 to 200 μm. In certain embodiments, the top layer has a preferred average thickness of about 60 to about 100 microns.

The uniformity of the deposited layer of the friction modifying particles on the surface of the fibrous base material is achieved by using a size of the particles that can range from about 1 to about 80 microns in diameter, and in certain embodiments from about 1 to about 50 microns, and in other certain embodiments from about 1 to about 20 microns. In certain embodiments, the particles have an average particle diameter of about 12 μm. In certain embodiments, it has been discovered that if the friction modifying particle size is too large or too small, a desired optimum three-dimensional structure not achieved and, consequently, the heat dissipation and anti-shudder characteristics are not as optimum.

The amount of coverage of friction modifying particles on the fibrous base material is sufficiently thick such that the layer of friction modifying particles has a three dimensional structure comprised of individual particles of the friction modifying material and voids or interstices between the individual particles. In certain embodiments, the top layer (of friction modifying particles) is less porous than the lower layer (of the fibrous base material).

Various types of friction modifying particle are useful in the friction material. In one embodiment, useful friction modifying particles include silica particles. Other embodiments can have friction modifying particles such as resin powders such as phenolic resins, silicone resins epoxy resins and mixtures thereof. Still other embodiments can include partial and/or fully carbonized carbon powders and/or particles and mixtures thereof; and mixtures of such friction modifying particles. In certain embodiments, silica particle such as diatomaceous earth, Celite®, Celatom®, and/or silicon dioxide are especially useful. The silica particles are inexpensive inorganic materials which bond to the base material. The silica particles provide high coefficients of friction to the friction material. The silica particles also provide the base material with a smooth friction surface and provides a good "shift feel" and friction characteristics to the friction material such that any "shudder" is minimized.

In certain embodiments, the friction modifying materials comprising the top layer of the friction material in the friction of the present invention can have an irregular shape. The irregular shaped friction modifying particles act to hold a desired quantity of lubricant at the surface of the fibrous base material due to the capillary action of many invaginations on the surface of the irregularly shaped friction modifying particle. In certain embodiments, a silica material such as celite is useful as a friction modifying material since celite has an irregular or rough surface.

In certain embodiments, the friction material comprises a fibrous base material which has a plurality of voids or interstices therein. The size of the voids in the fibrous bas material can range from about 0.5μ to about 20 μm.

In certain embodiments, the fibrous base material preferably has a void volume of about 50 to about 60% such that the fibrous base material is considered "dense" as compared to a "porous" woven material. In certain embodiments, the resin material at least partially fills the voids in the fibrous base material. The resin material is substantially uniformly dispersed throughout the thickness of the base material.

EXAMPLES

The following examples provide further evidence that the friction material of the present invention provides an improvement over conventional friction materials.

The sintered, porous carbon having an open, three dimensional structure with voids therein is produced as follows. The method of manufacturing the sintered, carbon friction material includes the steps of impregnating fibrous material with a resin before sintering; sintering the resin impregnated fibrous material; and producing a sintered, carbon friction material. The impregnating is carried out with a phenolic resin and the sintering is carried out at a temperature of 600° C. The fibrous materials were non-woven aramid fibers.

The sintered, porous carbon then is used with a base material. Typically, base material comprises about 5 to about 75%, by weight, of an aramid fiber; about 5 to about 75%, by weight, cotton fibers, about 5 to about 75%, by weight, carbon fibers; and, about 5 to about 75%, by weight of a filler material.

The sintering process includes the steps of compressing the raw paper sheet to form a dense sheet for better strength, compressing the paper during or after cure fore better strength and using high resin pickup (60-150%) for better strength. The resin includes phenolic, modified phenolic, epoxy, other type of organic resins, ceramic resins, and the like. Preferably, we sinter the material in nitrogen gas, argon, water vapor, ammonia, amine and the like at temperatures from 400 to 800 C.

Applications for the carbon friction materials of this invention include high pressure (up to 20 MPa) and high energy systems. Other applications include low and limited oil flow, or dry condition systems.

Table I shows the material processing for the carbonized samples.

TABLE I

| | pilot trial ID | |
|---|---|---|
| | A | B |
| caliper (actual) | 0.031" | 0.031" |
| Process one | sized to 0.025" | sized to 0.025" |
| Process two | 60% PU | 60% PU |
| caliper after sintering | 0.0245" | 0.0285" |
| weight loss after sintering (%) | 12% | 9% |
| tested plate thickness (measured) | 0.023" | 0.023" |
| Tested plate density (g/cm3) | 0.73 | 0.77 |

Table II shows the results of the sintered materials in wet oil, semi dry durability test.

TABLE II

| | Sample | |
|---|---|---|
| | Control (C) | C after sintering, |
| Lining thickness change & lining condition | 0.001 mm (0.2%) OK | 0.000 mm (0.7% gain) OK |

TABLE II-continued

| | Sample | |
| --- | --- | --- |
| | Control (C) | C after sintering, |
| Separator condition | dark stain | heat stain |
| Friction level change | 0.143-0.106 --> 26% | 0.121-0.139 --> +13% |
| Total cycles | 1377 | 2226 |

The results show that

1. Sintered C has better descending curves than the non-sintered one.
2. The mu level of sintered C increased with the test cycles.
3. Virgin C has more friction fade than other materials.

As can be seen, the sintered, carbon friction material of the present invention performs consistently better than the comparative material. Thus, the fibrous base material of the present invention performs much better at higher speed than the comparative material.

4. Sintered C has better durability than control C sample.

INDUSTRIAL APPLICABILITY

The present invention is useful as a high energy friction material for use with clutch plates, transmission bands, brake shoes, synchronizer rings, friction disks or system plates. The above descriptions of the preferred and alternative embodiments of the present invention are intended to be illustrative and are not intended to be limiting upon the scope and content of the following claims.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A method of manufacturing sintered, carbon friction material including the steps of: impregnating fibrous material with a resin; and sintering the resin impregnated fibrous material at a temperature ranging from 400 to 800° C. to produce a sintered, carbon friction material, wherein the sintered, carbon friction material has an open porosity above 50 percent by volume.

2. A method according to claim 1 wherein the sintered, carbon friction material is a sintered, porous carbon body.

3. A method according to claim 1 wherein the resin comprises a phenolic resin.

4. A method according to claim 1 wherein the sintering is carried out at a temperature ranging from 400° C. to 600° C.

5. A method according to claim 1 wherein the fibrous materials are non-woven, woven or paper fibrous materials.

6. A method according to claim 1 wherein the sintered, porous carbon friction material is an open, three dimensional structure having voids therein.

7. A method according to claim 1 wherein the sintered, porous carbon friction material is a self-supporting skeleton.

8. A method according to claim 1 wherein the sintering is carried out at a temperature ranging from 400° C. to 550° C.

* * * * *